(12) United States Patent
Patel et al.

(10) Patent No.: US 10,800,893 B2
(45) Date of Patent: Oct. 13, 2020

(54) LACTOSE-DERIVED HYDROGELS AND METHODS OF PRODUCING THE SAME

(71) Applicant: Winfield Solutions, LLC, Arden Hills, MN (US)

(72) Inventors: Hasmukh Patel, River Falls, WI (US); Marc Andrew Hillmyer, Minneapolis, MN (US); Larissa Ribeiro da Fonseca, Minneapolis, MN (US); Philip Thomas Dirlam, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 117 days.

(21) Appl. No.: 16/185,406

(22) Filed: Nov. 9, 2018

(65) Prior Publication Data
US 2020/0148836 A1 May 14, 2020

(51) Int. Cl.
*C08J 3/075* (2006.01)
*C08L 33/14* (2006.01)
*C08K 5/1545* (2006.01)

(52) U.S. Cl.
CPC .............. *C08J 3/075* (2013.01); *C08K 5/1545* (2013.01); *C08L 33/14* (2013.01); *C08J 2333/14* (2013.01); *C08L 2201/06* (2013.01)

(58) Field of Classification Search
CPC ... C08F 20/06; C08F 2/46; C08F 2/48; C13K 5/00; C08J 3/075; C08J 2333/14; C08L 33/14; C08L 2201/06; C08K 5/1545
See application file for complete search history.

(56) References Cited

U.S. PATENT DOCUMENTS

| | | |
|---|---|---|
| 5,474,915 A | 12/1995 | Dordick et al. |
| 2007/0128121 A1 | 6/2007 | Densmore et al. |
| 2013/0165533 A1 | 6/2013 | Liao et al. |
| 2014/0100111 A1 | 4/2014 | Schultz et al. |
| 2014/0113821 A1 | 4/2014 | Gu et al. |
| 2014/0259906 A1 | 9/2014 | Shan et al. |
| 2017/0196175 A1 | 7/2017 | Shan et al. |
| 2018/0297902 A1 | 10/2018 | Chand |
| 2019/0202998 A1 | 7/2019 | Yang et al. |

FOREIGN PATENT DOCUMENTS

| | | |
|---|---|---|
| EP | 2693893 A2 | 2/2014 |
| JP | 2006274227 A | 10/2006 |
| WO | 2017223261 A2 | 12/2017 |

OTHER PUBLICATIONS

Ahmed, Enas M., "Hydrogel: Preparation, characterization, and applications: A review", Journal of Advanced Research; vol. 6, 2015, pp. 105-121.
American Dairy Products, Institute, "2013 Dairy Products Utilization and Production Trends", 2013, 5 pages.
Andrzejewska, Ewa, "Photopolymerization kinetics of multifunctional monomers", Prog. Polym. Sci.; vol. 26, 2001, pp. 605-665.
Bhattacharyya, Lokesh et al., "Appendix 2 Dissociation Constants (pka) of Common Sugars and Alcohols", 2012, pp. 455-456.
Burdick, Jason A. et al., "Hyaluronic Acid Hydrogels for Biomedical Applications", Adv. Mater; vol. 23, No. 12, Mar. 25, 2011, 31 pages.
Decker, C., "Photoinitiated Crosslinking Polymerisation", Prog. Polym. Sci.; vol. 21, 1996, pp. 593-650.
Fan, Xiao-Dong et al., "Synthesis and Characterization of Lactose Based Resorcinol Resin", Journal of Applied Polymer Science; vol. 86, 2002, pp. 2581-2585.
Fang, Wei-Hai, "Photodissociation of Acrylic Acid in the Gas Phase: An ab Initio Study", J. Am. Chem. Soc.; vol. 122, 2000, pp. 10886-10894.
Feng, Shuting, "Determination of Proton Affinities and Acidity Constants of Sugars", J. Phys. Chem.; vol. 117, 2013, pp. 5211-5219.
Guilherme, Marcos R., "Superabsorbent hydrogels based on polysaccharides for application in agriculture as soil conditioner and nutrient carrier: A review", European Polymer Journal; vol. 72, 2015, pp. 365-385.
Hoijemberg, Pablo A. et al., "Two Routes Towards Photoinitiator-Free Photopolymerization in Miniemulsion: Acrylate Self-Initiation and Photoactive Surfactant", Macromol. Chem. Phys.; vol. 212, 2011, pp. 2417-2422.
Hou, Sijian et al., "Facile Synthesis of Chain-End Functionalized Glycopolymers for Site-Specific Bioconjugation", Bioconjugate Chem.; vol. 15, 2004, pp. 954-959.
Hu, Fangyu et al., "Nondestructive Quantification of Organic Compunds in Whole Mile without Pretreatment by Two-Dimensional NMR Spectroscopy", J. Agric. Food Chem.; vol. 55, 2007, pp. 4307-4311.
Huang, Yongshun et al., "Lactose-Containing Hydrogels for Enzyme Stabilization", Journal of Polymer Science; vol. 54, 2016, pp. 2507-2514.
Huang, Yongshun et al., "Synthesis and Anticoagulant Activity of Polyureas Containing Sulfated Carbohydrates", Biomacromolecules; vol. 15, 2014, pp. 4455-4466.
Illanes, A., "Lactose-Derived Prebiotics Chapter 1 Lactose: Production and Upgrading", 2016, 33 pages.
Khoushabi, A et al., "Photo-polymerization, swelling and mechanical properties of cellulose fibre reinfored poly(ethylene glycol) hydrogels", Composites Science and Technology; vol. 119, 2015, pp. 93-99.

(Continued)

Primary Examiner — Robert C Boyle
(74) Attorney, Agent, or Firm — Dorsey & Whitney LLP

(57) ABSTRACT

Lactose-derived hydrogels include at least lactose and methacrylic anhydride. A method of preparing lactose-derived hydrogels includes copolymerizing lactose methacrylate, methacrylic acid, and sodium methacrylate using light-induced photopolymerization. Polymerization proceeds in the absence of a photoinitiator. No volatile organic compounds or waste are produced by the method. The lactose may be provided by a milk permeate waste stream from the dairy or food processing industry.

20 Claims, 8 Drawing Sheets

(56) References Cited

OTHER PUBLICATIONS

Knolle, W. et al., "Direct (222 nm) photopolymerisation of acrylates. A laser flash photolysis and quantum chemical study", Radiation Physics and Chemistry; vol. 67, 2003, pp. 341-345.
Kosemund, Kirstin et al., "Safety evaluation of superabsorbent baby diapers", Regulatory Toxicology and Pharmacology; vol. 53, 2009, pp. 81-89.
Leach, Jennie B. et al., "Photocrosslinked Hyaluronic Acid Hydrogels: Natural, Biodegradable Tissue Engineering Scaffolds", Biotechnology and Bioengineering; vol. 82, No. 5, Jun. 5, 2003, pp. 578-589.
Lee, Juneyoung et al., "Trehalose hydrogels for stabilization of enzymes to heat", Polym. Chem.; vol. 6, 2015, pp. 3443-3448.
Lee, Kyung M. et al., "Initiatorless Photopolymerization of Liquid Crystal Monomers", ACS Appl. Mater. Interfaces; vol. 8, 2016, pp. 28040-28046.
Lin, Weiping et al., "Solution copolymerization of D-lactose-O-(p-vinylbenzyl)-hydroxime with acrylonitrile", Polymer; vol. 39 No. 20, 1998, pp. 4911-4914.
Mathur, Arvind M. et al., "Methods for Synthesis of Hydrogel Networks: A Review", J. Macromolecular Sci.; vol. 36, 1996, pp. 405-430.
Ortega, Alicia M. et al., "Structure-Property Relationships in Photopolymerizable Polymer Networks: Effect of Composition on the Crosslinked Structure and Resulting Thermomechanical Properties of a (Meth)acrylate-Based System", J. Appl. Polym. Sci.; vol. 110, 2008, pp. 1559-1572.
Patel, Vijay R. et al., "Preparation and CHaracterization of Freeze-dried Chitosan-Poly(Ethylene Oxide) Hydrogels for Site-Specific Antibiotic Delivery in the Stomach", Pharmaceutical Research; vol. 13, No. 4, 1996, pp. 588-593.
Patil, Nitin et al., "Sucrose Diacrylate: A Unique Chemically and Biologically Degradable Crosslinker for Polymeric Hydrogels", J Polym Sci A: Polym Chem; vol. 35, 1997, pp. 2221-2229.
Patil, Nitin S. et al., "Macroporous poly)sucrose acrylate) hydrogel for controlled release of macromolecules", Biomaterials; vol. 17, 1996, pp. 2343-2350.
Peppas, N A. et al., "Hydrogels in pharmaceutical formulations", European Journal of Pharmaceutics and Biopharmaceutics; vol. 50, 2000, pp. 27-46.
Shantha, K L. et al., "Synthesis and Evaluation of Sucrose-Containing Polymeric Hydrogels for Oral Drug Delivery", Journal of Applied Polymer Science; vol. 84, 2002, pp. 2597-2604.
Slaughter, Brandon V. et al., "Hydrogels in Regenerative Medicine", Adv Mater; vol. 21, Sep. 4, 2009, pp. 3307-3329.
Sun, Xue-Long et al., "Glycosaminoglycan Mimetic Biomaterials. 4. Synthesis of Sulfated Lactose-Based Glycopolymers That Exhibit Anticoagulant Activity", Biomacromolecules; vol. 3, 2002, pp. 1062-1070.
Sundekilde, Ulrik K. et al., "Relationship between the Metabolite Profile and Technological Properties of Bovine Milk from Two Dairy Breeds Elucidated by NMR-Based Metabolomics", J. Agric. Food Chem.; vol. 59, 2011, pp. 7360-7367.
USDA, "Dairy Products 2017 Summay (Apr. 2018)", National Agricultural Statistics Service, Apr. 2018, 58 pages.
Van Den Bulcke, An I. et al., "Structural and Rheological Properties of Methacrylamide Modified Gelatin Hydrogels", Biomacromolecules; vol. 1, 2000, pp. 31-38.
Van Dijk-Wolthuis, W.N.E. et al., "Synthesis, Characterization, and Polymerization of Glycidyl Methacrylate Derivatized Dextran", Macromolecules; vol. 28, 1995, pp. 6317-6322.
Van Vlierberghe, S. et al., "Biopolymer-Based Hydrogels as Scaffolds for Tissue Engineering Applications: A Review", Biomacromolecules; vol. 12, 2011, pp. 1387-1408.
Wang, Huiliang et al., "Self-Initiated Photopolymerization and Photografting of Acrylic Monomers", Macromol. Rapid Commun.; vol. 25, 2004, pp. 1095-1099.
Wang, Qun et al., "Synthesis and Application of Crabohydrate-Containing Polymers", Chem. Mater.; vol. 14, 2002, pp. 3232-3244.
Zhou, Wen-Jing et al., "Synthesis and Characterization of New Styrene Main-Chain Polymer with Pendant Lactose Moiety through Urea Linkage", Macromolecules; vol. 32, 1999, pp. 5507-5513.
Zhou, Wen-Jing et al., "Synthesis and Characterization of Random Hydrophilic/Hydrophobic Copolymers of Styrene and D-Lactose-O Vinylbenzylhydroxime", Journal of Polymer Science: Part A: Polymer Chemistry; vol. 36, 1998, pp. 2971-2978.
Zhou, Wen-Jing et al., "Synthesis and Properties of a Novel Water-Soluble Lactose-Containing Polymer and Its Cross-Linked Hydrogel", Macromolecules; vol. 30, 1997, pp. 7063-7068.
Zhou, Wen-Jing , "Synthesis and Thermal Properties of a Novel Lactose- Containing Poly(N-isopropylacrylamide-co-acrylamidolactamine) Hydrogel", Journal of Polymer Science: Part A: Polymer Chemistry; vol. 37, 1999, pp. 1393-1402.
"European Search Report for EP App. No. 19208203.0, dated Feb. 11, 2020".
Andriola, Amanda K. et al., "The effect of sterilization methods on the thermo-gelation", Polymer Degradation and Stability 95 (2010) 254-259.
Saeko, Murakami et al., "Bio-Based Hydrogels Prepared by Cross-Linking of Microbial Poly([gamma]-glutamic acid) with Various Saccharides",, vol. 7, No. 7, Jul. 1, 2006 (Jul. 1, 2006), pp. 2122-2127.
Singh, Baljit et al., "Synthesis and characterization of agar-starch based hydrogels for slow herbicide delivery applications", Nternational Journal of Plastics Technology, Central Institute of Plastics Engineering & Technology, Cipet, IN, vol. 19, No. 2, Dec. 16, 2015 (Dec. 16, 2015), pp. 263-274.
Walter, et al., "H-sensitive acrylic-based copolymeric hydrogels for the controlled release of a pesticide and a micronutrient", Journal of Applied Polymer Science, vol. 87, No. 3, Jan. 18, 2003 (Jan. 18, 2003), pp. 394-403.
Think USA Dairy, U.S. Dairy Export Council, "Whey and Milk Permeate—Cost Saving, Flavor Enhancing Ingredient", 2015, 4 pages.

LACTOSE-DERIVED HYDROGELS AND METHODS OF PRODUCING THE SAME

TECHNICAL FIELD

The present disclosure relates generally to lactose-derived hydrogels and methods of producing the same.

BACKGROUND

Whey, a by-product of dairy processing, includes about 60% lactose. Nearly three million tons of whey are produced annually in the United States. Only slightly more than half of this whey is further processed into useful commodities while the remainder is treated as waste.

Permeate is produced by the removal of proteins from whey or milk. It is generally considered a by-product or co-product of manufacture of whey protein concentrate, whey protein isolate, or micellar casein. The separation of proteins is generally accomplished by membrane filtration (e.g., ultrafiltration/microfiltration). Permeate may be referred to as milk permeate, whey protein, or de-proteinized whey. Depending on the source and process used, the lactose content and mineral content of permeate varies from 80-85% and 10-15%, respectively. Permeate also contains trace amount of organic acids and some non-protein nitrogen (e.g., urea).

Hydrogels include hydrophilic polymer networks and are capable of absorbing aqueous loads. Saccharides, including lactose, have been incorporated into polymer networks by multi-step processes involving protective group chemistries and/or organic solvents. There exists a need for an efficient, economical, and environmentally friendly means of utilizing the whey waste stream.

SUMMARY

Some implementations provide methods of producing a lactose-derived hydrogel. In embodiments, a method of producing a lactose-derived hydrogel includes distributing lactose in water to produce a lactose solution, adjusting the pH of the lactose solution, adding methacrylic anhydride to the lactose solution to produce a reaction mixture, adjusting the pH of the reaction mixture, neutralizing the reaction mixture, filtering the reaction mixture to produce a hydrogel precursor mixture, and exposing the hydrogel precursor mixture to light to produce a lactose-derived hydrogel.

In embodiments, the source of the lactose is one or more of purified lactose, milk permeate, whey, whey permeate, de-lactosed permeate, de-proteinized whey, dairy-derived polysaccharides, buttermilk, skim milk, mammalian milk, whole milk powder, non-fat dry milk, and butter milk powder.

In embodiments, the lactose is from a waste product of a dairy or food processing operation. The waste product may be milk permeate.

In embodiments, the molar ratio of lactose to methacrylic anhydride is from about 1.0:0.5 to about 1.0:2.0.

In embodiments, the pH of the reaction mixture is adjusted to at most about 10 with aqueous sodium hydroxide.

In embodiments, the reaction mixture includes lactose methacrylate, sodium methacrylate, and methacrylic acid.

In embodiments, the light induces copolymerization of monomers of two or more of lactose methacrylate, sodium methacrylate, and methacrylic acid.

In embodiments, the reaction mixture is neutralized to a pH of about 7 with hydrochloric acid.

In embodiments, the filtering of the reaction mixture is by gravity filtration, vacuum filtration, or centrifugation.

In embodiments, the hydrogel is undried, the undried hydrogel is lyophilized to produce a dried hydrogel, and the dried hydrogel is rewetted to increase the equilibrium water content compared to the equilibrium water content of the undried hydrogel.

In embodiments, a method of utilizing a lactose-containing waste product includes obtaining the waste product, heating the waste product in water to produce a lactose solution, adding methacrylic anhydride to the lactose solution to produce a reaction mixture, adjusting the pH of the reaction mixture, neutralizing the reaction mixture, filtering the reaction mixture to produce a hydrogel precursor mixture, and exposing the hydrogel precursor mixture to light to produce a lactose-derived hydrogel.

In embodiments, the waste product is from a dairy or food processing operation.

In embodiments, the waste product is selected from one or more of milk permeate, whey, whey permeate, de-lactosed permeate, de-proteinized whey, dairy-derived polysaccharides, buttermilk, skim milk, mammalian milk, whole milk powder, non-fat dry milk, and butter milk powder. The waste product may be milk permeate.

In embodiments, the molar ratio of lactose to methacrylic anhydride is from about 1.0:0.5 to about 1.0:2.0.

In embodiments, the pH of the reaction mixture is adjusted to at most about 10 with aqueous sodium hydroxide.

In embodiments, the reaction mixture comprises lactose methacrylate, sodium methacrylate, and methacrylic acid.

In embodiments, the light induces copolymerization of monomers of two or more of lactose methacrylate, sodium methacrylate, and methacrylic acid.

In embodiments, the filtering of the reaction mixture is by gravity filtration, vacuum filtration, or centrifugation.

BRIEF DESCRIPTION OF THE DRAWINGS

FIG. 9A is a graph of stress-strain curves. FIG. 9B is a graph of compressive elastic modulus and failure strain, each as a function of molar equivalent of methacrylic anhydride relative to lactose. The error bars represent standard deviation with n≥5.

FIG. 10A is a graph of gel fraction; 10B is a graph of G' (storage modulus) and G" (loss modulus) as a function of time in the presence of UV light; 10C is a graph of water uptake as a function of time; and 10D shows stress-strain curves. The error bars represent standard deviation with n=3.

FIG. 11A is a graph of compressive elastic modulus; FIG. 11B is a graph of failure strain. The error bars represent standard deviation with n=5.

DETAILED DESCRIPTION

Figure 1:
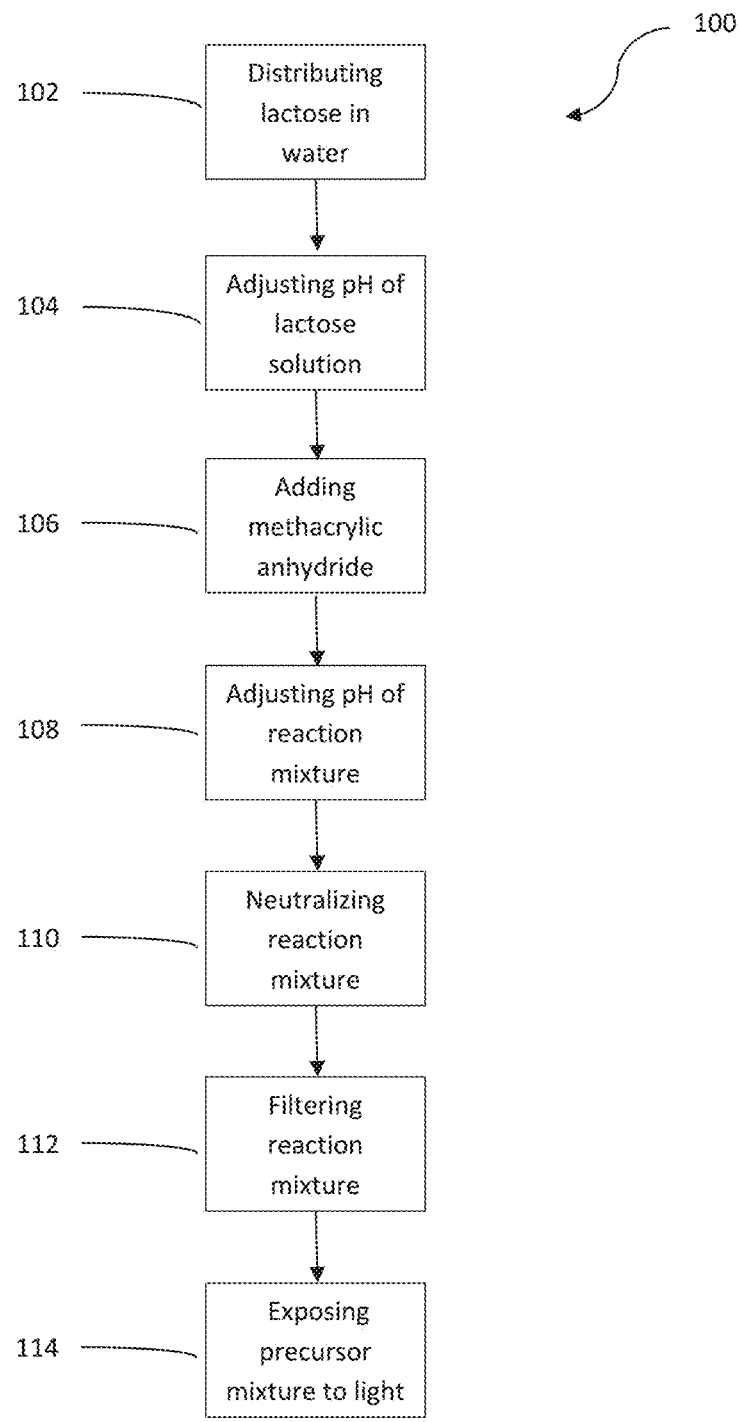
FIG. 1 is a flow diagram of a hydrogel preparation method according to one embodiment.

Hydrogel formulations including lactose or lactose-based polymers are disclosed herein. The lactose-derived hydrogels are biodegradable. Methods of preparing the lactose-derived hydrogels are also disclosed. The methods are atom economical (i.e., do not produce waste), environmentally friendly, and do not produce volatile organic compounds.

As used herein, the term "hydrogel" refers to hydrophilic polymer networks that may be swollen with water and are generally capable of absorbing water at loadings many times greater than their dry mass. The network structures may be formed with covalent bonds between polymer chains, but can also be constructed with physical crosslinks arising from, for example, chain entanglement, electrostatic interactions, and associations via strong hydrogen bonding or van der Waals interactions. The incorporation of carbohydrates into the polymer structure may introduce hydrophilicity that is helpful for the preparation of hydrogels. Lactose-containing polymers may function as hydrogels via polymer chemistries such as polyureas, phenolics, and free radical polymerization of styrenic and acrylamide derivatives.

Hydrogel Formulations

A lactose-derived hydrogel may be generally understood as a composition including at least lactose and an acrylic acid derivative.

The lactose may include either or both of the α- and β-anomers of lactose.

The lactose may be derivatized lactose, such as esterified lactose. In one example, the esterified lactose is lactose methacrylate. Lactose may be derivatized at any one or more of the eight free hydroxyl groups. Lactose methacrylate may include lactose mono-methacrylate, lactose di-methacrylate, lactose tri-methacrylate, higher lactose methacrylates, or any combination thereof. The methacrylate monomers may be present in any proportion.

The lactose may be an isolated and/or relatively pure lactose. For example, the lactose may be a commercially available lactose monohydrate having ≥94% or ≥96% α-lactose. The lactose may be provided in milk permeate, whey, whey permeate, de-lactosed permeate, de-proteinized whey, dairy-derived polysaccharides, buttermilk, skim milk, mammalian milk, whole milk powder, non-fat dry milk, butter milk powder, or any combination thereof. The lactose may be provided in a waste stream from, for example, a dairy or food processing operation. In one example, the lactose is provided in waste milk permeate from a dairy operation.

In the implementations and use of a lactose-derived hydrogel, sourcing lactose from an existing waste stream may help utilize an untapped feedstock, reduce the cost of producing the lactose-derived hydrogel, and/or reduce the cost of producing the material that generated the lactose-containing waste stream.

In some examples, the lactose is dissolved in water prior to combining the lactose with the acrylic acid derivative.

The acrylic acid derivative may be methacrylic anhydride, methacrylic monomers, methacryloyl chloride, activated acrylates, acrylic anhydride, acrylic acid, or any combination thereof. In one example, the acrylic acid derivative is methacrylic anhydride.

The lactose and methacrylic anhydride may be combined to form a hydrogel precursor mixture. In some examples, lactose and methacrylic anhydride are combined in the presence of sodium hydroxide to produce a hydrogel precursor mixture including lactose methacrylate, sodium methacrylate, and/or methacrylic acid.

The ratio of lactose to methacrylic anhydride in the precursor mixture may be from about 1.0:0.5 to about 1.0:2.0, such as about 1.0:0.5, about 1.0:1.0, or about 1.0:2.0.

In the implementations and use of a lactose-derived hydrogel, varying the ratio of lactose to methacrylic anhydride in the precursor mixture may help tune various hydrogel properties, such as rheological characteristics, structure, gel strength, and/or visual clarity.

As described in more detail in Example 7, the disclosed lactose-derived hydrogels may have an initial water content of about 65 wt %. The initial water content may be independent of ratio of lactose to methacrylic anhydride in the precursor mixture formulations.

As described in more detail in Examples 6 and 11, the disclosed lactose-derived hydrogels have a gel fraction, which is the percentage of mass remaining after drying, soaking, and a second drying step, relative to the initial dry mass. The lactose-derived hydrogels may have an average gel fraction of about 35 wt % to about 60 wt %, about 35 wt % to about 55 wt %, about 35 wt % to about 50 wt %, about 35 wt % to about 45 wt %, about 40 wt % to about 60 wt %, about 45 wt % to about 60 wt %, about 50 wt % to about 60 wt %, about 35 wt % to about 60 wt %, about 39 wt %, about 40 wt %, about 47 wt %, or about 55 wt %.

As described in more detail in Examples 7 and 11, the disclosed lactose-derived hydrogels are able to take up water or other liquids. The hydrogels may be able to swell with liquid to an equilibrium state while maintaining their shape and/or remaining insoluble. The lactose-derived hydrogels may have an equilibrium water content of about 50 wt % to about 400 wt %, about 100 wt % to about 400 wt %, about 150 wt % to about 400 wt %, about 200 wt % to about 400 wt %, about 250 wt % to about 400 wt %, about 300 wt % to about 400 wt %, about 50 wt % to about 350 wt %, about 50 wt % to about 300 wt %, about 50 wt % to about 250 wt %, about 50 wt % to about 200 wt %, about 50 wt % to about 150 wt %, about 50 wt % to about 100 wt %, about 75 wt % to about 375 wt %, about 80 wt %, about 230 wt %, about 240 wt %, about 260 wt %, or about 370 wt %.

In some implementations, the lactose-derived hydrogels may be lyophilized. Following lyophilization, the hydrogels may be re-wetted. Lyophilized lactose-derived hydrogels may take up more water than undried lactose-derived hydrogels. For example, and as described in more detail in Example 9, lyophilized lactose-derived hydrogels may have an equilibrium water content of about 300 wt % to about 4500 wt %, about 500 wt % to about 4500 wt %, about 1000 wt % to about 4500 wt %, about 1500 wt % to about 4500 wt %, about 2000 wt % to about 4500 wt %, about 2500 wt % to about 4500 wt %, about 3000 wt % to about 4500 wt %, about 3500 wt % to about 4500 wt %, about 300 wt % to about 4000 wt %, about 300 wt % to about 3500 wt %, about 300 wt % to about 3000 wt %, about 300 wt % to about 2500 wt %, about 300 wt % to about 2000 wt %, about 300 wt % to about 1500 wt %, about 300 wt % to about 1000 wt %, about 400 wt %, about 700 wt %, about 3800 wt %, or about 4000 wt %.

The flexibility and/or ductility of the disclosed lactose-derived hydrogels may vary based on the ratio of lactose to methacrylic anhydride in the precursor mixture. (Examples 9 and 11.) For example, lower ratios ratio of lactose to methacrylic anhydride may produce hydrogels that are more flexible, more ductile, less rigid, and/or less brittle than hydrogels having higher ratios of lactose to methacrylic anhydride.

The mechanical properties, such as compressive elastic modulus and failure strain, of the disclosed lactose-derived hydrogels may vary based on the ratio of lactose to methacrylic anhydride in the precursor mixture. (Examples 9 and 11.) The hydrogels may have a compressive elastic modulus of about 10 kPa to about 750 kPa, about 50 kPa to about 750 kPa, about 100 kPa to about 750 kPa, about 150 kPa to about 750 kPa, about 200 kPa to about 750 kPa, about 250 kPa to about 750 kPa, about 300 kPa to about 750 kPa, about 350 kPa to about 750 kPa, about 400 kPa to about 750 kPa, about 450 kPa to about 750 kPa, about 500 kPa to about 750 kPa, about 550 kPa to about 750 kPa, about 600 kPa to about 750 kPa, about 10 kPa to about 700 kPa, about 10 kPa to about 650 kPa, about 10 kPa to about 600 kPa, about 10 kPa to about 550 kPa, about 10 kPa to about 500 kPa, about 10 kPa to about 450 kPa, about 10 kPa to about 400 kPa, about 10 kPa to about 350 kPa, about 10 kPa to about 300 kPa, about 10 kPa to about 250 kPa, about 10 kPa to about 200 kPa, about 10 kPa to about 150 kPa, about 10 kPa to about 100 kPa, about 10 kPa to about 50 kPa, about 12 kPa, about 21 kPa, about 27 kPa, about 30 kPa, or about 735 kPa.

The hydrogels may have a failure strain of about 20% to about 60%, about 25% to about 60%, about 30% to about 60%, about 35% to about 60%, about 40% to about 60%, about 45% to about 60%, about 50% to about 60%, about 20% to about 55%, about 20% to about 50%, about 20% to about 45%, about 20% to about 40%, about 20% to about 35%, about 20% to about 30%, about 25% to about 57%, about 25%, about 32%, about 41%, about 55%, or about 57%.

In some implementations, the disclosed lactose-derived hydrogels utilize a lactose source that has been known as a waste byproduct or waste stream from a separate manufacturing process. The lactose-derived hydrogels may be biodegradable. The lactose-derived hydrogels, and the methods of making them, may be more environmentally friendly than known hydrogels and production methods. The methods are described in more detail immediately below.

Methods of Producing Lactose-Derived Hydrogels

Methods of producing the disclosed lactose-derived hydrogels include copolymerizing lactose methacrylate, methacrylic acid, and sodium methacrylate in a one-pot reaction using light-induced photopolymerization in the absence of a photoinitiator. No volatile organic compounds or waste products are generated by the methods. The ratios of lactose to methacrylic anhydride may be varied to produce hydrogels with different properties.

FIG. 1 illustrates a method 100 of preparing a lactose-derived hydrogel. The method 100 includes a step 102 of distributing lactose in water to produce a lactose solution, a step 104 of adjusting the pH of the lactose solution, a step 106 of adding methacrylic anhydride to the lactose solution to produce a reaction mixture, a step 108 of adjusting the pH of the reaction mixture, an optional step 110 of neutralizing the reaction mixture, a step 112 of filtering the reaction mixture to produce a hydrogel precursor mixture, and a step 114 of exposing the hydrogel precursor mixture to light to produce a lactose-derived hydrogel.

In step 102, the lactose and water may be stirred, which may help distribute the lactose. Additionally or alternatively, the lactose and water may be heated, such as from about 65° C. to about 90° C., which may help distribute the lactose. The lactose and water may be stirred and/or heated until the lactose is partially or completely dissolved in the water to produce a lactose solution.

The lactose may be an isolated and/or relatively pure lactose. For example, the lactose may be a commercially available lactose monohydrate having ≥94% α-lactose or ≥96%. The lactose may be provided in milk permeate, whey, whey permeate, de-lactosed permeate, de-proteinized whey, dairy-derived polysaccharides, buttermilk, skim milk, mammalian milk, whole milk powder, non-fat dry milk, butter milk powder, or any combination thereof. The lactose may be provided in a waste stream from, for example, a dairy or food processing operation. In one example, the lactose is provided in waste milk permeate from a dairy operation.

The lactose solution produced in step 102 may be cooled, such as passively to room temperature, prior to step 104.

In step 104, the pH of the lactose solution is adjusted to a pH of at most about 10. The adjusted pH may range from about 6 to at most about 10. In one example, aqueous sodium hydroxide is added to the solution to increase the pH.

In step 106, the lactose solution and methacrylic anhydride may be stirred together. Methacrylic anhydride may be added in an amount that yields a desired ratio of lactose to methacrylic anhydride. Examples of molar ratios of lactose to methacrylic anhydride include about 1.0:0.5, about 1.0:1.0, and about 1.0:2.0. The lactose and methacrylic anhydride may react to produce lactose methacrylate.

In step 108, the pH of the reaction mixture is adjusted to a pH of at most about 10. In one example, a pH of about 9.5±0.5 is maintained with the slow addition of aqueous sodium hydroxide.

In one example, the lactose is functionalized with methacrylate groups by esterification with methacrylic anhydride to produce lactose methacrylate. The lactose methacrylate may include lactose mono-methacrylate, lactose di-methacrylate, lactose tri-methacrylate, and/or higher lactose methacrylate monomers. In the example, sodium methacrylate is generated as a by-product of the esterification and as a result of hydrolysis. Methacrylic acid is also generated in the esterification reaction. The lactose methacrylate, sodium methacrylate, and/or methacrylic acid may copolymerize.

In some implementations, the reaction mixture is allowed to stir, such as for about 30 minutes at room temperature, after the addition of sodium hydroxide and before step 110.

In step 110, the reaction mixture may be neutralized to a pH of about 7. In one implementation, the reaction mixture is neutralized by the addition of hydrochloric acid. In some implementations, step 110 is not performed.

In step 112, the reaction mixture may be filtered by, for example, gravity filtration, vacuum filtration, centrifugation, which may help to remove insoluble particles. In one implementation, the reaction mixture is gravity filtered through qualitative filter paper. The filtrate is used in step 114 as a hydrogel precursor mixture.

In step 114, the hydrogel precursor mixture is exposed to light, which may help to induce self-initiated copolymerization of lactose methacrylate, methacrylic acid, and sodium methacrylate. Lactose di- and higher methacrylates may serves as crosslinkers during polymerization. In one example, the light is in the ultraviolet spectrum. In one example, the UV light has a wavelength of about 365 nm and/or an intensity of about 3.4 mW/cm$^2$ to about 3.8 mW/cm$^2$. In one example, the hydrogel precursor mixture is exposed to UV light for about 60 minutes at room temperature.

The hydrogel precursor mixture polymerizes to form a hydrogel. Gelation time, as described in Example 5 and shown in FIGS. 4A-4C, may be from about 4 minutes to about 14 minutes, about 6 minutes to about 14 minutes, about 8 minutes to about 14 minutes, about 10 minutes to about 14 minutes, about 12 minutes to about 14 minutes, about 4 minutes to about 12 minutes, about 4 minutes to about 10 minutes, about 4 minutes to about 8 minutes, about 4 minutes to about 6 minutes, about 5 minutes to about 6 minutes, about 6 minutes to about 7 minutes, or about 12 minutes.

Figure 4A:
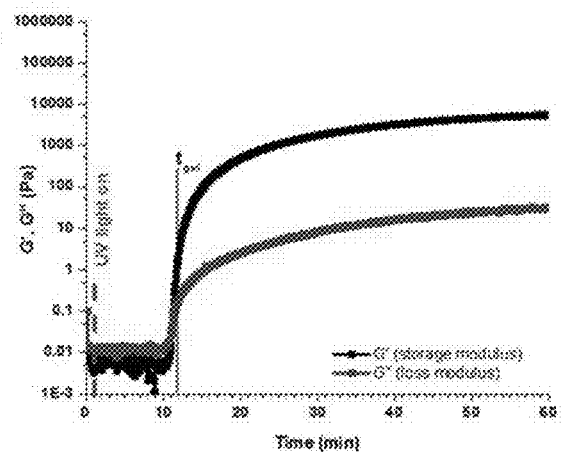
FIGS. 4A-4C are graphs of G' (storage modulus) and G" (loss modulus) as functions of time in the presence of UV light for hydrogel precursor mixtures according to embodiments. The mixtures had lactose:methacrylic anhydride molar ratios of 1.0:0.5 (FIG. 4A), 1.0:1.0 (FIG. 4B), and 1.0:2.0 (FIG. 4C).
Figure 4B:
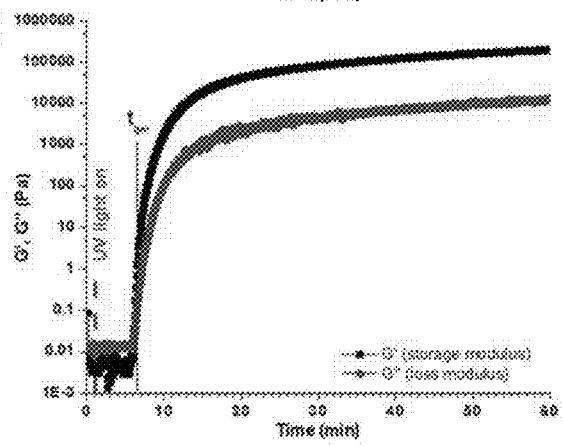
Figure 4C:
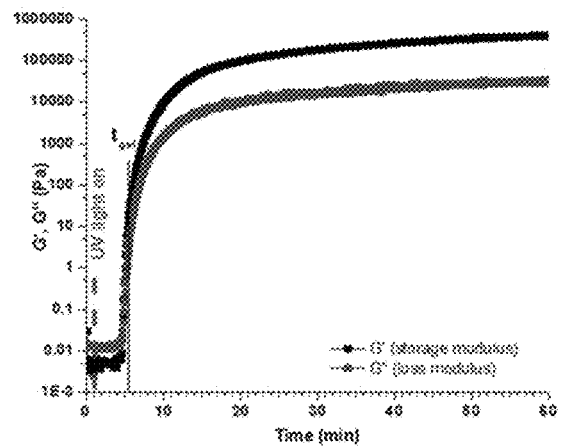

After gelation, the storage modulus (G') values of a lactose-derived hydrogel may continue to increase until reaching a plateau value, as described in Example 5 and shown in FIGS. 4A-4C. The plateau G' value of the lactose-derived hydrogels may be from about 1 kPa to about 500 kPa, about 5 kPa to about 500 kPa, about 10 kPa to about 500 kPa, about 50 kPa to about 500 kPa, about 100 kPa to about 500 kPa, about 200 kPa to about 500 kPa, about 300 kPa to about 500 kPa, about 1 kPa to about 400 kPa, about 1 kPa to about 300 kPa, about 1 kPa to about 200 kPa, about 1 kPa to about 100 kPa, about 1 kPa to about 50 kPa, about 1 kPa to about 10 kPa, about 5 kPa, about 200 kPa, or about 400 kPa.

Methods disclosed herein of producing lactose-derived hydrogels may have numerous benefits, including benefits over known methods of producing hydrogels. The disclosed methods may employ green chemistry techniques and/or be more environmentally friendly than known production methods. The disclosed methods may utilize a lactose source that has been known as a waste byproduct or waste stream from a separate manufacturing process, such as from the dairy or food processing industry. The disclosed methods may be more cost-effective than known methods.

The disclosed methods are readily adjustable, such as by tuning the molar ratios of the lactose and methacrylic anhydride starting materials, to produce hydrogels with desired features, such as structure, gel strength, visual clarity, and rheological properties.

Photopolymerization of lactose methacrylate, methacrylic acid, and sodium methacrylate monomers may proceed in the absence of a photoinitiator, which permits exclusion of a photoinitiator from the methods. The disclosed methods may achieve high polymerization rates, even in the absence of a photoinitiator.

Other benefits may include, but are not limited to, performing the method in water, performing the method at ambient temperature, producing no waste (i.e., the method is atom economic), and/or producing no volatile organic compound by the method.

EXAMPLES

The following examples illustrate various aspects of the disclosure and should not be considered limiting.

Example 1

Preparation of Lactose-Derived Hydrogels

Lactose-derived hydrogels were prepared according to the following general procedure. To investigate the influence of various components, modifications were made to the general procedure as described in subsequent examples.

To a 100 mL round-bottom flask equipped with a magnetic stirbar was added lactose monohydrate (10.0 g, 27.8 mmol) (≥96% α-lactose, MilliporeSigma, St. Louis, Mo.) and deionized water (20 mL). The mixture was stirred at 65° C. until a clear, colorless solution was produced (about 15 minutes). The solution was then allowed to cool to room temperature and aqueous sodium hydroxide (2.5 M, about 3 drops) was added until the solution had a pH of about 10. Methacrylic anhydride (94%, with 2000 ppm tropanol A as inhibitor, MilliporeSigma, St. Louis, Mo.) was added and the mixture was stirred vigorously. A pH of 9.5±0.5 was maintained with the slow addition of aqueous sodium hydroxide; the pH was not allowed to exceed 10. After the addition of sodium hydroxide was complete, the reaction mixture was allowed to stir at room temperature for 30 minutes. The reaction scheme is illustrated below:

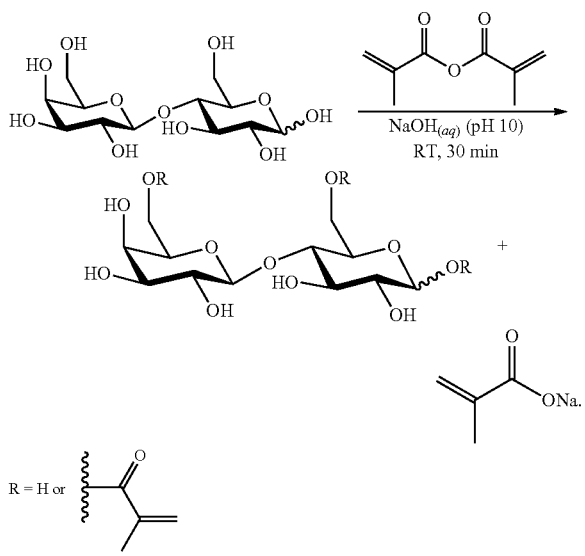

Hydrochloric acid (1 M) (ACS Plus, Thermo Fisher Scientific, Hampton, N.H.) was added to neutralize the reaction mixture to pH 7. The mixture was then gravity filtered through qualitative filter paper to yield a hydrogel precursor mixture, which was transferred to a polystyrene petri dish.

The hydrogel precursor mixture was then UV irradiated (365 nm, 3.4-3.8 mW/cm$^2$) for 60 minutes at room temperature. Photo-induced copolymerization of lactose methacrylate, methacrylic acid, and sodium methacrylate in the precursor mixture yielded a hydrogel. The reaction scheme is illustrated below:

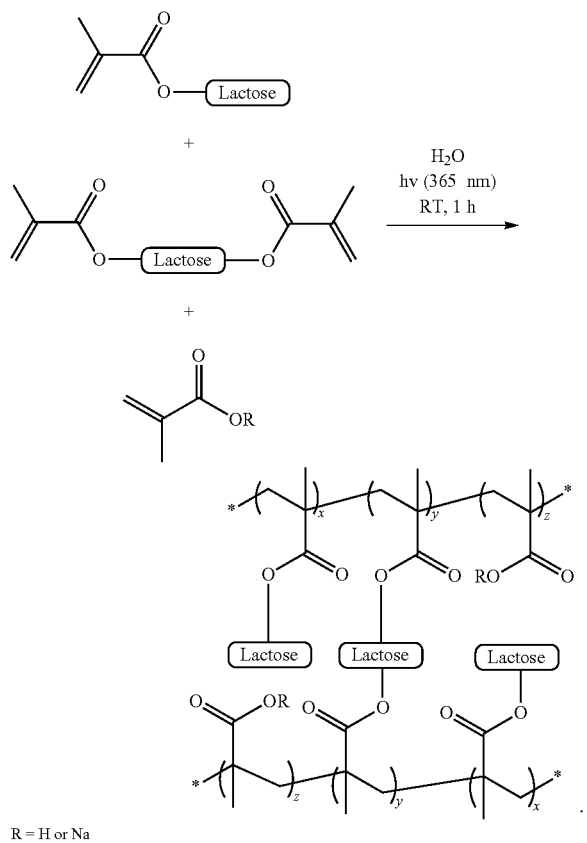

Example 2

Preparation of Lactose-Derived Hydrogels with Varying Methacrylic Anhydride Loading Hydrogels were prepared according to the method of Example 1 with the following modifications.

A hydrogel with low methacrylic anhydride loading (1.0:0.5 lactose:methacrylic anhydride (mol:mol)) was prepared using methacrylic anhydride (2.07 mL, 13.9 mmol) and aqueous sodium hydroxide (2.5 M, 5.6 mL total volume). The hydrogel was transparent and colorless.

A hydrogel with medium methacrylic anhydride loading (1.0:1.0 lactose:methacrylic anhydride (mol:mol)) was prepared using methacrylic anhydride (4.14 mL, 27.8 mmol) and aqueous sodium hydroxide (2.5 M, 11.1 mL total volume). The hydrogel was translucent.

A hydrogel with high methacrylic anhydride loading (1.0:2.0 lactose:methacrylic anhydride (mol:mol)) was prepared using methacrylic anhydride (8.28 mL, 55.6 mmol) and aqueous sodium hydroxide (2.5 M, 22.2 mL total volume). The hydrogel was opaque and white.

Example 3

Analysis of Lactose Methacrylate Monomer Composition in Hydrogel Precursor Mixtures The extent of methacrylation and relative distribution of lactose mono-, di-, and higher methacrylates was investigated by ESI-MS and $^1$H NMR.

Figure 2:
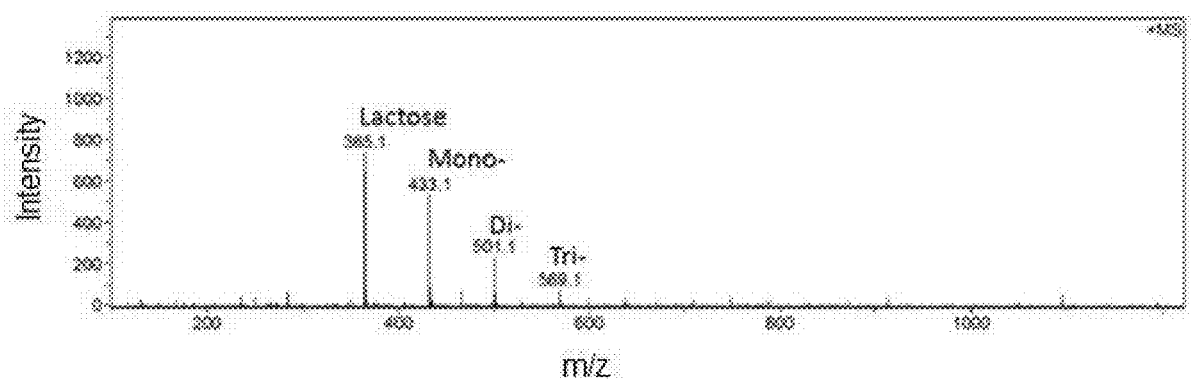
FIG. 2 is an ESI-MS high-resolution mass spectrum of a hydrogel precursor mixture (1.0:1.0 lactose:methacrylic anhydride (mol:mol)) according to an embodiment.

An ESI-MS high-resolution mass spectrum from a sample of a hydrogel precursor mixture having medium methacrylic anhydride loading (1.0:1.0 lactose:methacrylic anhydride (mol:mol)) prepared according to Example 2 is shown in FIG. 2. Peaks for free lactose, lactose mono-methacrylate, lactose di-methacrylate, and lactose tri-methacrylate are labeled in FIG. 2.

$^1$H NMR spectroscopy was conducted with a Bruker Avance III HD 400 or 500 in D$_2$O. Signals for the olefinic protons from methacrylate groups attached to lactose were observed (results not shown). Considerable peak overlap hindered both quantification of the extent of methacrylation and determination of the relative distribution of lactose mono-, di-, and higher methacrylates.

Example 4

Effect of UV Light on Polymerization of Lactose Methacrylate

The effect of UV light on polymerization of lactose methacrylate was investigated by monitoring the rheological behavior of a hydrogel precursor mixture having medium methacrylic anhydride loading (1.0:1.0 lactose:methacrylic anhydride (mol:mol)) prepared according to Example 2. The precursor mixture was monitored for 30 minutes at ambient temperature without exposing the sample to UV light. All samples were loaded in a liquid state onto a 20 mm diameter quartz plate and analyzed using a DHR-3 Rheometer (TA Instruments, New Castle, Del.) (at 0.1 Hz, 0.01% strain, 25° C.) coupled with an Omnicure S2000UV Light Guide (Excelitas Technologies, Waltham, Mass.) having a 365 nm wavelength and an intensity of 3.4-3.8 mW/cm$^2$. Gelation time values were reported as an average of two independent measurements.

Figure 3:
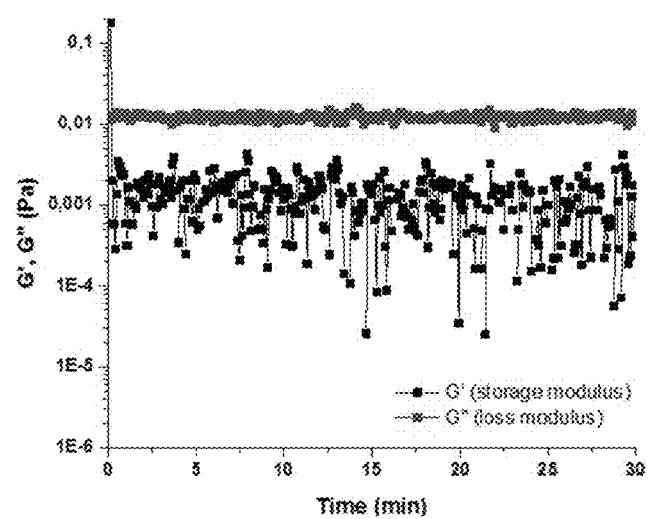
FIG. 3 is a graph of G' (storage modulus) and G" (loss modulus) as function of time in the absence of UV light for a hydrogel precursor mixture (1.0:1.0 lactose:methacrylic anhydride (mol:mol)) according to an embodiment.

Results are shown in FIG. 3. Over the entire 30 min in the absence of exposure to UV light, G" (loss modulus) was greater than G' (storage modulus). Both values remained low and constant. These results demonstrate that that the hydrogel precursor mixture retained liquid-like behavior and no gel was formed. Accordingly, UV light induced copolymerization of lactose methacrylate, methacrylic acid, and sodium methacrylate in the precursor mixture at ambient temperature.

Example 5

Effects of Methacrylic Anhydride Loading on Formation of Hydrogels

The effects of varying levels of methacrylic anhydride loading on the formation of hydrogels and on gelation time were investigated.

Hydrogel precursor mixtures of low, medium, and high methacrylic anhydride loading were prepared as described in Example 2. One minute after the start of each study, a UV light was turned on and each precursor mixture was irradiated (365 nm, 3.4-3.8 mW/cm$^2$) for 60 minutes. Rheology characteristics were measured during the course of the studies and as described for Example 4.

Results are presented in FIGS. 4A-4C as storage (G') and loss (G") moduli over time. For all precursor mixtures, G' and G" values began low, and G" was greater than G', which is indicative of a liquid-like behavior. Gelation occurs at the point of crossover between G' and G", and gelation time ($t_{gel}$) is marked in FIGS. 4A-4C. Gelation time of the precursor mixture having low methacrylic anhydride loading was about 12 minutes (FIG. 4A). Gelation time of the precursor mixture having medium methacrylic anhydride loading was about 6-7 minutes (FIG. 4B). Gelation time of the precursor mixture having high methacrylic anhydride loading was about 5-6 minutes (FIG. 4C).

After the gelation point, a plateau region with higher G' values relative to G" values was observed, which is indicative of a solid gel-like behavior. After 60 minutes of UV treatment, the hydrogel from the precursor mixture having low methacrylic anhydride loading exhibited a plateau G' value of about 5 kPa (5000 Pa, FIG. 4A). The hydrogel from the precursor mixture having medium methacrylic anhydride loading exhibited a plateau G' value of about 200 kPa (200,000 Pa, FIG. 4B). The hydrogel from the precursor mixture having high methacrylic anhydride loading exhibited a plateau G' value of about 400 kPa (400,000 Pa, FIG. 4C).

Without being limited to any mechanism or mode of action, the increased G' and G" values following initiation of UV exposure indicate increased viscosity, which may be due to polymer formation and eventual gelation.

Without being limited to any mechanism or mode of action, the faster gelation times of the precursor mixtures having medium and high methacrylic anhydride loading compared to the gelation time of the precursor mixture having low methacrylic anhydride loading may be a result of a higher content of lactose di- and trimethacrylate monomers in the former. The higher content may enable more rapid crosslinking of monomers, and thus a faster rise of G' compared to the precursor mixture having low methacrylic anhydride loading.

Without being limited to any mechanism or mode of action, the plateau regions with higher G' values compared to G" values may indicate the formation of an elastic network with solid gel-like behavior.

Overall, the results shown in FIGS. 4A-4C may indicate that higher degrees of crosslinking are present in hydrogels prepared from precursor mixtures having higher initial methacrylic anhydride loadings compared to hydrogels prepared from precursor mixtures having lower initial loadings. The higher degrees of crosslinking may be a result of higher lactose di- and trimethacrylate content in the precursor mixtures having higher loadings compared to lower loadings. These results demonstrate that properties of lactose-derived hydrogels are tunable at least by adjusting the molar ratio of lactose to methacrylic anhydride.

Example 6

Gel Fractions of Lactose Methacrylate Hydrogels

The initial water content of and the gel fraction of hydrogels prepared according to Example 2 were determined.

All experiments were carried out in triplicate. The hydrogels were weighed after synthesis ($m_{hydrogel}$), then freeze-dried and weighed again ($m_{1,dried}$). The following equation (1) was used to calculate the initial water content of each hydrogel composition:

$$\text{Initial Water Content (wt. \%)} = \left(1 - \frac{m_{1,dried}}{m_{hydrogel}}\right) \times 100 \quad (1)$$

The dried samples ($m_{1,dried}$) were soaked for 66 hours in an excess of water, which was replaced multiple times to help remove all soluble components, then freeze-dried again, and weighed again ($m_{2,dried}$). The percentage of the remaining mass relative to the initial dry mass was taken as the gel fraction of each hydrogel composition according to the following equation (2):

$$\text{Gel Fraction (wt. \%)} = \left(\frac{m_{2,dried}}{m_{1,dried}}\right) \times 100 \quad (2)$$

Figure 5:
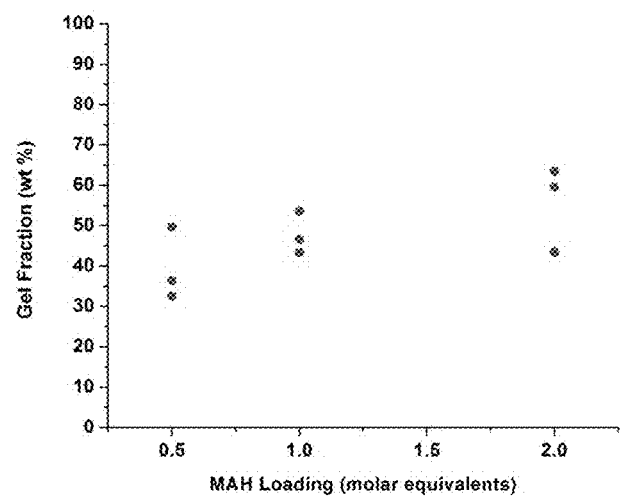
FIG. 5 is a graph of hydrogel gel fraction as a function of molar equivalent of methacrylic anhydride relative to lactose in hydrogel precursor mixtures according to embodiments.

Results are shown in FIG. 5. Hydrogels prepared from a precursor mixture having low methacrylic anhydride loading had an average gel fraction of 39 wt %. Hydrogels prepared from a precursor mixture having medium methacrylic anhydride loading had an average gel fraction of 47 wt %. Hydrogels prepared from a precursor mixture having high methacrylic anhydride loading had an average gel fraction of 55 wt %.

The data suggest that the degree of crosslinking in a lactose methacrylate hydrogel is directly proportional to the methacrylic anhydride loading of the precursor mixture from which the hydrogel is made. The results are consistent with the rheological data obtained in Example 5.

Example 7

Water Uptake by Lactose Methacrylate Hydrogels

The extent to which hydrogels prepared according to Example 2 could absorb water was investigated.

Cylindrical hydrogel samples were synthesized in triplicate, weighed ($m_{hydrogel}$), and soaked in distilled water. At different time points, the hydrogels were removed from the water, excess water was wiped off, and the swollen hydrogels were weighed ($m_t$). Water uptake percentage of each hydrogel composition was calculated according to the following equation (3):

$$\text{Water Uptake (wt. \%)} = \left(\frac{m_t \times WC}{m_{hydrogel}}\right) \times 100 \quad (3)$$

In equation (3), WC is the initial water content fraction calculated in the equation (1) as described in Example 6.

Figure 6:
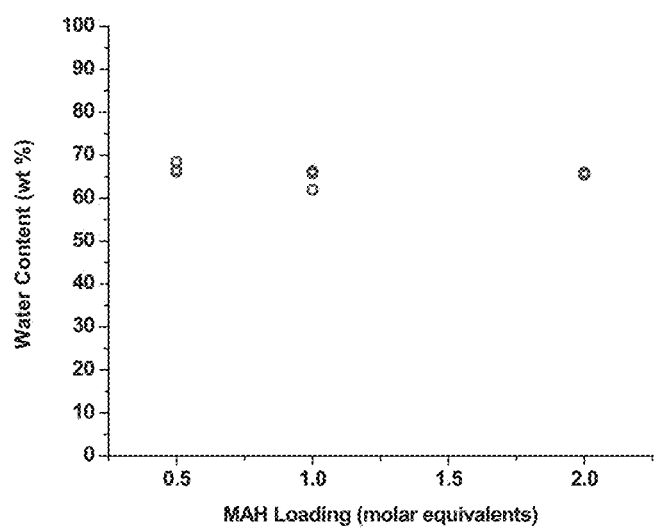
FIG. 6 is a graph of hydrogel water content (immediately after photopolymerization) as a function of molar equivalent of methacrylic anhydride relative to lactose in hydrogel precursor mixtures according to embodiments.
Figure 7:
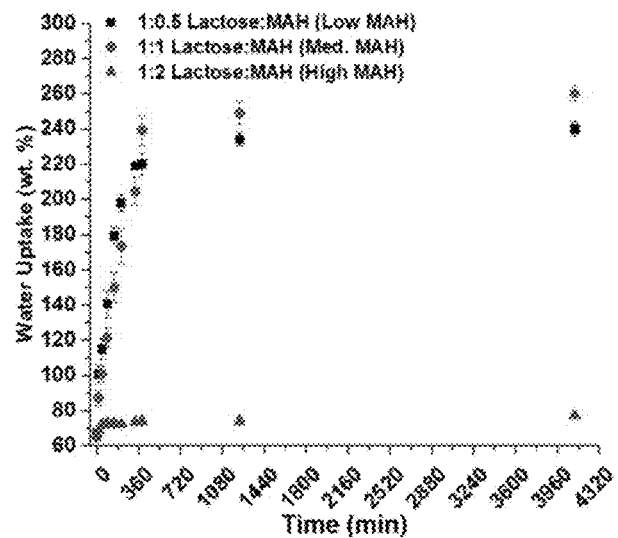
FIG. 7 is a graph of water uptake as a function of time for hydrogels prepared from hydrogel precursor mixtures according to embodiments. The error bars represent standard deviation with $n \geq 3$.

Results are presented in FIGS. 6 and 7. FIG. 6 shows water content data gathered immediately after photopolymerization. The results demonstrate that, immediately after photopolymerization, all hydrogels had an initial water content (as a percentage of total hydrogel mass) of about 65 wt % regardless of the methacrylic anhydride loading of the precursor mixture formulations.

FIG. 7 shows water uptake of the hydrogels as a function of time. Hydrogels prepared from a precursor mixture having low methacrylic anhydride loading reached an equilibrium water content of about 230 wt % (from an initial water content of about 65 wt %) in about 20 hours. Hydrogels prepared from a precursor mixture having medium methacrylic anhydride loading reached an equilibrium water content of about 260 wt % in about 20 hours. Hydrogels prepared from a precursor mixture having high methacrylic anhydride loading reached an equilibrium water content of about 80 wt % in about 4 hours.

The results demonstrate that the hydrogels are able to accommodate additional water as a function of soaking time. Hydrogels prepared from precursor mixtures having lower methacrylic anhydride loadings reached equilibrium water contents higher than those of hydrogels prepared from precursor mixtures having higher methacrylic anhydride loadings. Hydrogels prepared from precursor mixtures having lower methacrylic anhydride loadings reached equilibrium water contents in a longer amount of time than did hydrogels prepared from precursor mixtures having higher methacrylic anhydride loadings.

Without being limited to any mechanism or mode of action, lactose methacrylate hydrogels are able to accommodate additional water inside their polymeric network structures. Lower monomer cross-linking permits higher water uptake.

Example 8

Water Uptake by Dried Lactose Methacrylate Hydrogels

The extent to which hydrogels, prepared according to Example 2 and then dried, could absorb water was investigated.

Cylindrical hydrogel samples were washed with water for seven days to remove impurities such as unreacted lactose and sodium methacrylate. The fully swollen hydrogels ($m_{1,swollen}$) were freeze-dried. The dried powder hydrogels were weighed ($m_{dried}$) and added to a vial containing water. The powder hydrogels were mixed in water for one minute with a vortex and were then centrifuged for one more minute. The excess water was decanted and the swollen powder hydrogels were weighed ($m_{2,swollen}$). Water absorbing percentage of each hydrogel composition was calculated according to the following equation (4):

$$\text{Water Absorbing (wt. \%)} = \left(\frac{m_{2,swollen} - m_{dried}}{m_{dried}}\right) \times 100 \quad (4)$$

All lyophilized hydrogels achieved an equilibrium water content in less than 5 minutes regardless of the methacrylic anhydride loading of the precursor mixture formulations (data not shown).

Figure 8:
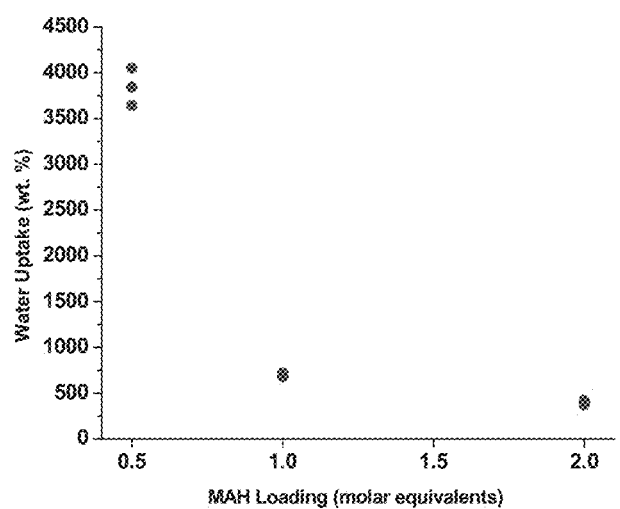
FIG. 8 is a graph of water uptake of dried hydrogels as a function of molar equivalent of methacrylic anhydride relative to lactose in hydrogel precursor mixtures according to embodiments.

As shown in FIG. 8, lyophilized hydrogels prepared from a precursor mixture having low methacrylic anhydride loading reached an average equilibrium water content of about 3800 wt % and a peak equilibrium water content of about 4000 wt %. Lyophilized hydrogels prepared from a precursor mixture having medium methacrylic anhydride loading reached an equilibrium water content of about 700 wt %. Lyophilized hydrogels prepared from a precursor mixture having high methacrylic anhydride loading reached an equilibrium water content of about 400 wt %.

Compared to the results of Example 7 (FIG. 7), each hydrogel, regardless of the methacrylic anhydride loading of the precursor mixture formulations, reached an equilibrium water content significantly faster following lyophilization compared to without lyophilization. Compared to the results of Example 7 (FIG. 7), each hydrogel, regardless of the methacrylic anhydride loading of the precursor mixture formulations, demonstrated a significantly increased water uptake following lyophilization compared to without lyophilization.

Without being limited to any mechanism or mode of action, the increase in water uptake rate and/or equilibrium water content after lyophilization may be attributable to an increase in the surface area-to-volume ratio of the powdered hydrogels. Alternatively or additionally, the lyophilization process may impart a greater degree of porosity on the powdered hydrogels than those formed immediately after photopolymerization.

Example 9

Compression Testing of Hydrogels

The mechanical properties of hydrogels prepared according to Example 2 were investigated by unconfined compression testing.

Cylindrical hydrogel samples with a diameter of 2 cm and height of about 1 cm were uniaxially compressed on a Shimadzu Autograph AGS-X equipped with two parallel stainless steel plates at a send speed of 1 mm/min until failure. The compressive elastic modulus was calculated with Trapezium software from the slope of the stress-strain curve between 10% and 20% strain.

Figure 9A:
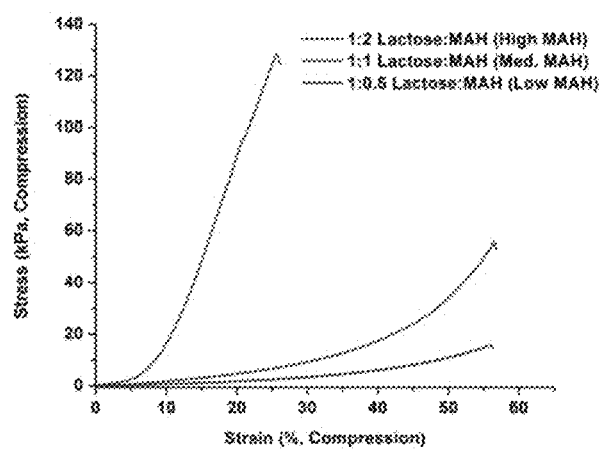
FIGS. 9A-9B are graphs of uniaxial compression testing data of hydrogels prepared from hydrogel precursor mixtures according to embodiments.
Figure 9B:
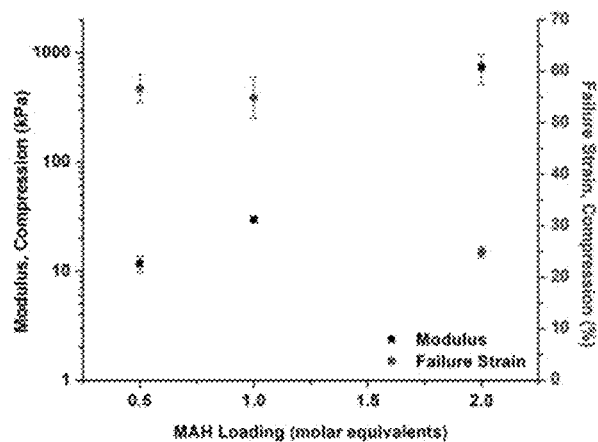

Results are presented in FIGS. 9A-9B. Hydrogels prepared from a precursor mixture having low methacrylic anhydride loading had a compressive elastic modulus of 11.7 kPa and a failure strain of 56.7%. The hydrogels were flexible and ductile. Hydrogels prepared from a precursor mixture having medium methacrylic anhydride loading had a compressive elastic modulus of 29.5 kPa and failure strain of 54.8%. Compared to hydrogels prepared with low methacrylic anhydride loading, the hydrogels with medium loading were similarly ductile but slightly more rigid. Hydrogels prepared from a precursor mixture having high methacrylic anhydride loading had a compressive elastic modulus of 735 kPa and failure strain of 24.9%. These hydrogels were notably more rigid and brittle than the hydrogels prepared from precursor mixtures having lower methacrylic anhydride loadings.

Without being limited to any mechanism or mode of action, the increase in elastic modulus and decrease in failure strain corresponding to higher initial methacrylic anhydride loadings (as compared to lower initial methacrylic anhydride loadings) may be attributable to a higher content of lactose di- and tri-methacrylates in the hydrogel precursor mixture, which may result in a higher crosslink density.

Example 10

Preparation of Lactose-Derived Hydrogels from Milk Permeate

Hydrogels were prepared using milk permeate according to a method similar to that of Example 1. Milk permeate was obtained from a cheese processing facility (Land O'Lakes Inc.) and was used in place of the lactose monohydrate in Example 1. An $^{1}$H NMR calibration curve of lactose was constructed (data not shown), from which it was determined that the milk permeate was composed of 83% lactose (40% of α-anomer and 60% of β-anomer).

To a 100 mL round bottom flask equipped with a magnetic stirbar was added milk permeate (10.0 g) containing 83% lactose (23.1 mmol) and deionized water (16.6 mL). The mixture was stirred at 90° C. for 60 minutes, yielding a turbid solution. The solution was then allowed to cool to room temperature and aqueous sodium hydroxide (2.5 M, about 3 drops) was added until the solution had a pH of about 10. Methacrylic anhydride (1.72 mL, 11.6 mmol) was added and the mixture was stirred vigorously. A pH of 9.5±0.5 was maintained with the slow addition of aqueous sodium hydroxide (2.5 M, 4.65 mL); the pH was not allowed to exceed 10. After the addition of sodium hydroxide was complete, the reaction mixture was allowed to stir at room temperature for 30 minutes. Hydrochloric acid (1 M) was added to neutralize the reaction mixture to pH 7. The mixture was then gravity filtered through qualitative filter paper to yield a hydrogel precursor mixture, which was transferred to a polystyrene petri dish. The hydrogel precursor mixture was then UV irradiated (365 nm, 3.4-3.8 mW/cm$^2$) for 60 minutes at room temperature. Photo-induced copolymerization of lactose methacrylate, methacrylic acid, and sodium methacrylate in the precursor mixture yielded a transparent hydrogel.

Compared to Example 1, more extensive heating (90° C.) was needed to achieve adequate dissolution of lactose in water prior to addition of methacrylic anhydride. Without being limited to any mechanism or mode of action, the need for a higher temperature may be attributable to the poorer solubility of the β-anomer of lactose compared to the α-anomer.

The soluble portion of milk permeate (0.5g/mL) at 90° C. included 77% lactose as determined using the $^1$H NMR calibration curve. Based on 77% lactose, the appropriate amount of methacrylic anhydride to yield a low methacrylic anhydride loading (1.0:0.5 lactose: methacrylic anhydride (mol:mol)) was determined.

A minute amount of insoluble material remained throughout the reaction. This intractable material was not found to adversely affect hydrogel formation. Removing the material by gravity filtration improved the clarity and aesthetics of the resulting hydrogels.

Example 11

Properties of Hydrogels Prepared from Milk Permeate

The properties of hydrogels prepared with milk permeate were tested as described in the preceding examples of hydrogels prepared with commercial α-lactose. In FIGS. 10 and 11, "milk permeate" samples are those of milk permeate heated to about 90° C.; methacrylic anhydride was added to the unfiltered heterogenous solution.

Figure 10A:
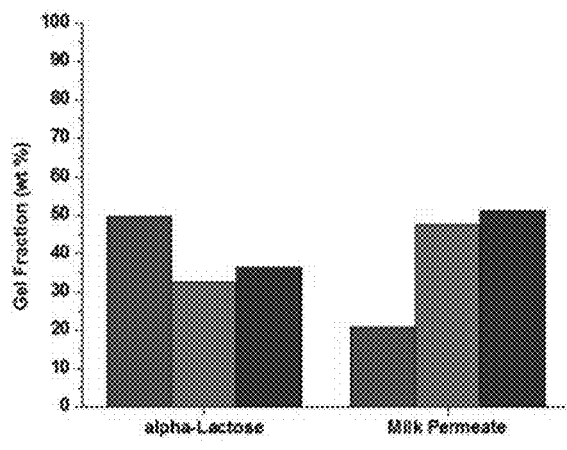
FIGS. 10A-10D are graphs of features of milk permeate hydrogels and lactose hydrogels according to embodiments. The hydrogels were prepared from hydrogel precursor mixtures having lactose:methacrylic anhydride molar ratios of 1.0:0.5.

Gel fractions were determined as in Example 6 and results are presented in triplicate in FIG. 10A. The results demonstrate that gel fractions of hydrogels prepared from a precursor mixture of milk permeate and a low methacrylic anhydride loading were about 40 wt %. The gel fractions were similar to those observed for hydrogels prepared from a precursor mixture of α-lactose and a low methacrylic anhydride loading.

Figure 10B:
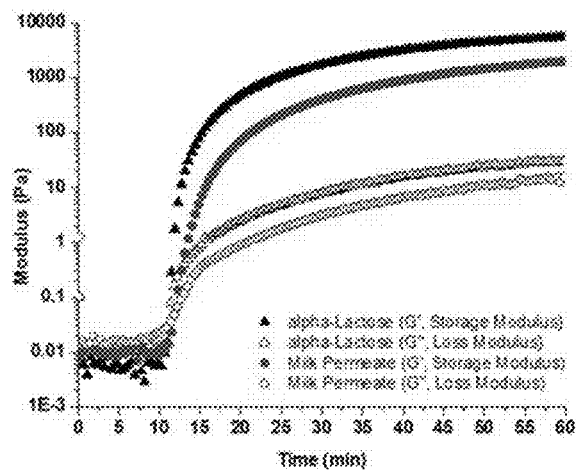

Rheological characteristics were determined as in Example 5 and results are presented in FIG. 10B. Gelation times of milk permeate hydrogels were about 12 minutes. These results were similar to the gelation times of α-lactose hydrogels.

The plateau values for storage (G') and loss (G") moduli were lower for the milk permeate hydrogels compared to the α-lactose hydrogels (FIG. 10B). Without being limited to any mechanism or mode of action, the lower plateau values may indicate lower crosslinking extent in the hydrogel network of the milk permeate hydrogels compared to the α-lactose hydrogels.

Figure 10C:
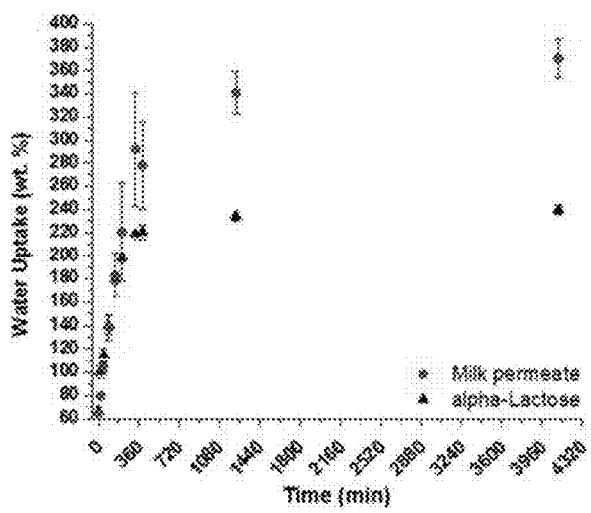

Water uptake was determined as in Example 7 and results are presented in FIG. 10C. After 66 hours, the milk permeate hydrogels reached an equilibrium water content of about 370 wt % (from an initial water content of about 65 wt %). After 66 hours, the α-lactose hydrogels reached an equilibrium water content of about 240 wt %.

The results presented in FIG. 10C are consistent with those presented in FIG. 10B and may suggest a lower crosslinking extent in the hydrogel network of the milk permeate hydrogels compared to the α-lactose hydrogels. Without being limited to any mechanism or mode of action, the difference in crosslinking density may be attributable to the incorporation of more monofunctional methacrylate derivatives in the milk permeate hydrogels, which may result from the reaction of methacrylic anhydride with various metabolites present in milk permeate.

Figure 10D:
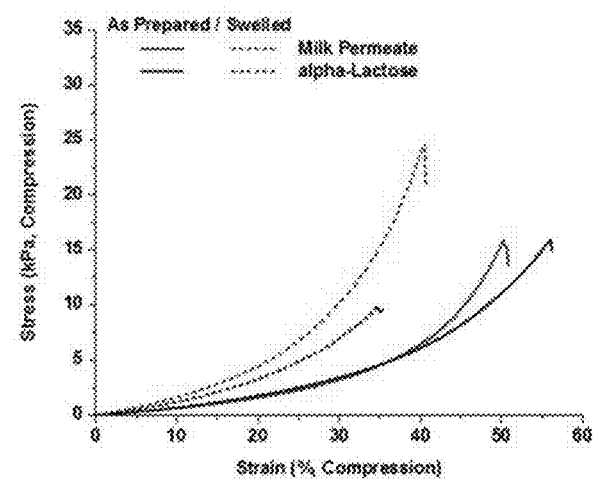
Figure 11A:
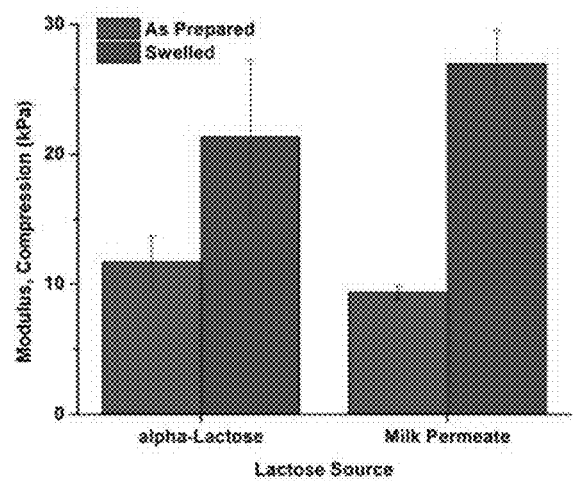
FIG. 11A-11B are graphs of uniaxial compression testing data of milk permeate hydrogels and lactose hydrogels, as-prepared post photopolymerization and after swelling in water for 16 hours, according to embodiments. The hydrogels were prepared from hydrogel precursor mixtures having lactose:methacrylic anhydride molar ratios of 1.0:0.5.
Figure 11B:
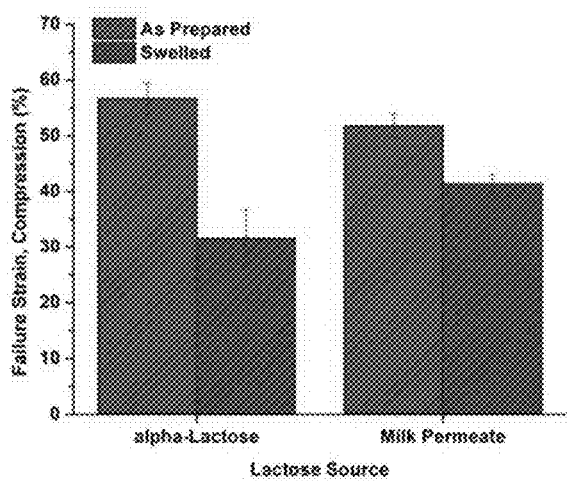

Compression testing was performed as in Example 9 and results are presented in FIGS. 10D, 11A, and 11B. Milk permeate hydrogels as-prepared (i.e., about 65 wt % water) demonstrated a compressive elastic modulus of 9.36 kPa and a failure strain of 51.8%. α-Lactose hydrogels as-prepared (i.e., about 65 wt % water) demonstrated a slightly higher compressive elastic modulus of 11.7 kPa and a slightly higher failure strain of 56.6%.

After swelling in water for 16 hours, the milk permeate hydrogels exhibited a compressive elastic modulus of 27.0 kPa with a failure strain of 41.4%. The α-lactose hydrogels exhibited a compressive elastic modulus of 21.3 kPa with a failure strain of 31.6%. Both the milk permeate and the α-lactose hydrogels became more rigid and brittle upon swelling in water for 16 hours.

The results from Example 11 demonstrate that hydrogels were successfully prepared from directly utilized milk permeate in place of pure α-lactose. The resulting milk permeate hydrogels had similar properties to the α-lactose hydrogels.

Although the present disclosure provides references to preferred embodiments, persons skilled in the art will recognize that changes may be made in form and detail without departing from the spirit and scope of the invention.

What is claimed is:

1. A method of producing a lactose-derived hydrogel, the method comprising:
   distributing lactose in water to produce a lactose solution;
   adjusting the pH of the lactose solution;
   adding methacrylic anhydride to the lactose solution to produce a reaction mixture;
   adjusting the pH of the reaction mixture;
   neutralizing the reaction mixture;
   filtering the reaction mixture to produce a hydrogel precursor mixture; and
   exposing the hydrogel precursor mixture to light to produce a lactose-derived hydrogel.

2. The method of claim 1, wherein the lactose is from one or more of purified lactose, milk permeate, whey, whey permeate, de-lactosed permeate, de-proteinized whey, dairy-derived polysaccharides, buttermilk, skim milk, mammalian milk, whole milk powder, non-fat dry milk, and butter milk powder.

3. The method of claim 1, wherein the lactose is from a waste product of a dairy or food processing operation.

4. The method of claim 3, wherein the waste product is milk permeate.

5. The method of claim 1, wherein the molar ratio of lactose to methacrylic anhydride is from about 1.0:0.5 to about 1.0:2.0.

6. The method of claim 1, wherein the pH of the reaction mixture is adjusted to at most about 10 with aqueous sodium hydroxide.

7. The method of claim 1, wherein the reaction mixture comprises lactose methacrylate, sodium methacrylate, and methacrylic acid.

8. The method of claim 7, wherein the light induces copolymerization of monomers of two or more of lactose methacrylate, sodium methacrylate, and methacrylic acid.

9. The method of claim 1, wherein the reaction mixture is neutralized to a pH of about 7 with hydrochloric acid.

10. The method of claim 1, wherein the filtering is by gravity filtration, vacuum filtration, or centrifugation.

11. The method of claim 1, wherein the hydrogel is undried, the undried hydrogel is lyophilized to produce a dried hydrogel, and the dried hydrogel is rewetted to increase the equilibrium water content compared to the equilibrium water content of the undried hydrogel.

12. A method of utilizing a lactose-containing waste product, the method comprising:
obtaining the waste product;
heating the waste product in water to produce a lactose solution;
adding methacrylic anhydride to the lactose solution to produce a reaction mixture;
adjusting the pH of the reaction mixture;
neutralizing the reaction mixture;
filtering the reaction mixture to produce a hydrogel precursor mixture; and
exposing the hydrogel precursor mixture to light to produce a lactose-derived hydrogel.

13. The method of claim 12, wherein the waste product is from a dairy or food processing operation.

14. The method of claim 12, wherein the waste product is selected from one or more of milk permeate, whey, whey permeate, de-lactosed permeate, de-proteinized whey, dairy-derived polysaccharides, buttermilk, skim milk, mammalian milk, whole milk powder, non-fat dry milk, and butter milk powder.

15. The method of claim 14, wherein the waste product is milk permeate.

16. The method of claim 12, wherein the molar ratio of lactose to methacrylic anhydride is from about 1.0:0.5 to about 1.0:2.0.

17. The method of claim 12, wherein the pH of the reaction mixture is adjusted to at most about 10 with aqueous sodium hydroxide.

18. The method of claim 12, wherein the reaction mixture comprises lactose methacrylate, sodium methacrylate, and methacrylic acid.

19. The method of claim 18, wherein the light induces copolymerization of monomers of two or more of lactose methacrylate, sodium methacrylate, and methacrylic acid.

20. The method of claim 12, wherein the filtering is by gravity filtration, vacuum filtration, or centrifugation.

* * * * *